US012141652B1

(12) United States Patent
Kotlarsky

(10) Patent No.: US 12,141,652 B1
(45) Date of Patent: Nov. 12, 2024

(54) BARCODE-AWARE OBJECT VERIFICATION

(71) Applicant: ZEBRA TECHNOLOGIES CORPORATION, Lincolnshire, IL (US)

(72) Inventor: Anatoly Kotlarsky, Churchville, PA (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 18/386,394

(22) Filed: Nov. 2, 2023

(51) Int. Cl.
G06K 7/14 (2006.01)
G06N 20/00 (2019.01)
G06V 10/764 (2022.01)

(52) U.S. Cl.
CPC ........... G06K 7/1413 (2013.01); G06N 20/00 (2019.01); G06V 10/764 (2022.01)

(58) Field of Classification Search
CPC .... G06N 20/00; G06V 10/764; G06K 7/1404; G06K 7/1408; G06K 7/1413; G06K 7/1417; G06K 7/1439; G06K 7/1443; G06K 7/1447
See application file for complete search history.

(56) References Cited

U.S. PATENT DOCUMENTS

| 2020/0242392 | A1* | 7/2020  | Scott     | G06N 3/045   |
|--------------|-----|---------|-----------|--------------|
| 2021/0295078 | A1* | 9/2021  | Barkan    | G06V 30/2247 |
| 2021/0374376 | A1* | 12/2021 | Swope     | G06K 7/1417  |
| 2022/0067568 | A1* | 3/2022  | Hemmatiyan| G06V 10/7747 |

* cited by examiner

Primary Examiner — Laura A Gudorf
(74) Attorney, Agent, or Firm — Yuri Astvatsaturov

(57) ABSTRACT

A method captures first image data representing at least a portion of a first item and decodes a first barcode in the first image data and determines a first item template associated with the first barcode. The first item template comprises first identifier data identifying the first item from other items and first region-of-interest data specifying a first region-of-interest of the first item. Based on the first region-of-interest, a second region-of-interest of the first image data is determined. The second region-of-interest is modified to fit within a boundary of the first image data. The method determines whether a ratio of an area of the second and first regions-of-interest is greater than a first threshold and generates second image data comprising the second region-of-interest when the ratio is greater than the first threshold. The method determines the second image data corresponds to the first identifier data and generates first data indicating the first barcode is matched with the first item.

20 Claims, 10 Drawing Sheets

BARCODE-AWARE OBJECT VERIFICATION

BACKGROUND

Barcodes represent data in a visual, machine-readable form. One-dimensional barcodes, for example, represent data by varying the widths and/or spacing of a series of parallel lines. Two-dimensional barcodes (sometimes referred to as "matrix barcodes") are also used and may have additional capacity to encode data relative to one-dimensional barcodes due to their two-dimensional structure. Barcode scanners are devices that include optical elements that can read or otherwise interpret barcodes. A barcode may be decoded using a scanner to produce a code that may uniquely identify the barcode (and/or an object with which the barcode is associated).

SUMMARY

In various examples, methods of barcode-aware object verification are generally described. In some examples, the methods may include capturing, by a scanner device comprising an image sensor, first image data representing at least a portion of a first item; decoding, by the scanner device, a first barcode represented in the first image data; determining a first item template associated with the first barcode, the first item template comprising first identifier data identifying the first item from among other items and first region-of-interest data specifying a first region-of-interest of the first item; determining, based on the first region-of-interest, a second region-of-interest of the first image data, the second region-of-interest being modified to fit within a boundary of the first image data; determining whether a ratio of an area of the second region-of-interest and an area of the first region-of-interest is greater than a first threshold; generating second image data comprising the second region-of-interest of the first image data when the ratio is greater than the first threshold; determining, by a first machine learning model, that the second image data corresponds to the first identifier data identifying the first item; and generating first data indicating that the first barcode is matched with the first item.

In at least some further examples, the first item template may represent at least one of a contextual or a geometric relationship between the first barcode and the first region-of-interest of the first item. In various examples, the first item template may include data of the first barcode (e.g., at least one of a barcode type of the first barcode, coordinate data representing a location the first barcode, orientation data representing an orientation of the first barcode, and size data representing a size of the first barcode). In various further cases, the first item template may include a template image of the first region-of-interest of the first item, while in other cases the first item template may include the first region-of-interest data without a template image. In some examples where the first item template includes a template image, the first item template may also include at least one of coordinate data representing a location in the template image of the first barcode, orientation data representing an orientation in the template image of the first barcode, or size data representing a size of the first barcode in the template image.

In various examples, barcode-aware object verification systems are generally described. In various examples, these systems may include an image sensor; at least one processor; and/or non-transitory computer-readable memory storing instructions. In various examples, the instructions, when executed by the at least one processor, may be effective to control the image sensor to: capture first image data representing at least a portion of a first item; decode a first barcode represented in the first image data; determine a first item template associated with the first barcode, the first item template comprising first identifier data identifying the first item from among other items and first region-of-interest data specifying a first region-of-interest of the first item; determine, based on the first region-of-interest, a second region-of-interest of the first image data, the second region-of-interest being modified to fit within a boundary of the first image data; determine whether a ratio of an area of the second region-of-interest and an area of the first region-of-interest is greater than a first threshold; generate second image data comprising the second region-of-interest of the first image data when the ratio is greater than the first threshold; determine, using a first machine learning model, that the second image data corresponds to the first identifier data identifying the first item; and generate first data indicating that the first barcode is matched with the first item.

In some other examples, other methods of barcode-aware object verification may be described. In some examples, such other methods may include receiving first image data representing at least a portion of a first item; decoding a first barcode represented in the first image data; determining a first item template associated with the first barcode, the first item template comprising first identifier data identifying the first item from among other items and first region-of-interest data specifying a first region-of-interest of the first item; determining, based on the first region-of-interest, a second region-of-interest of the first image data, the second region-of-interest being modified to fit within a boundary of the first image data; determining whether a ratio of an area of the second region-of-interest and an area of the first region-of-interest is greater than a first threshold; generating second image data comprising the second region-of-interest of the first image data when the ratio is greater than the first threshold; determining, by a first machine learning model, that the second image data corresponds to the first identifier data identifying the first item; and generating first data indicating that the first barcode is matched with the first item.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
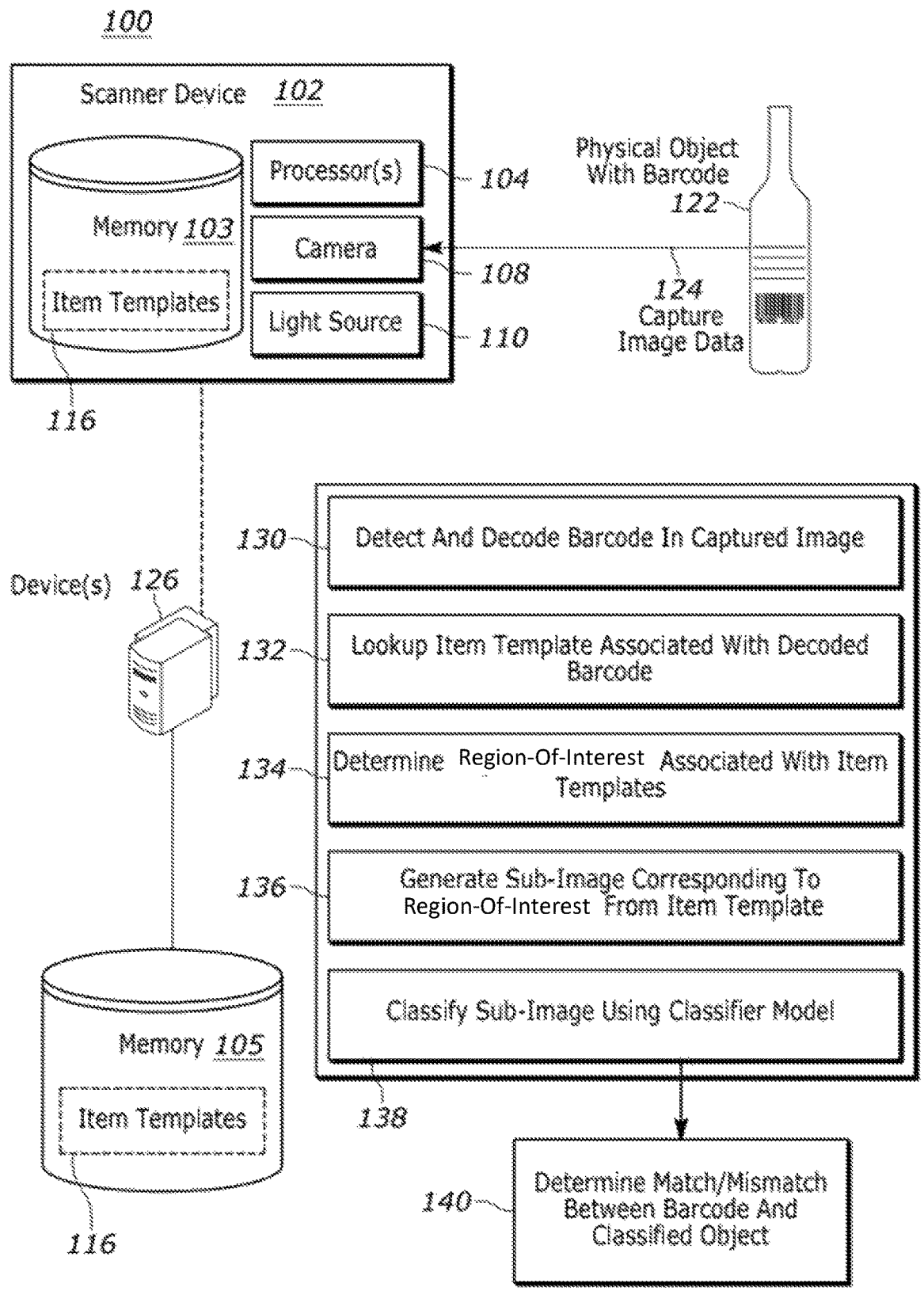
FIG. 1 is a diagram of a barcode-aware object verification system, in accordance with various aspects of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Barcodes can be used to quickly and accurately retrieve information about an object to which a barcode is affixed (or with which the barcode is otherwise displayed or associated). For example, barcodes can be used in point-of-sale systems to determine the price of objects, thereby speeding up the checkout process. In other examples, barcodes may be used in inventory systems to provide information such as object quantity, category, price, location, etc. In general, a barcode may be a visual code that may be scanned and decoded using a hardware and/or software-based barcode scanner (sometimes referred to as a barcode reader) to generate a code that identifies the barcode and, by extension, the object with which the barcode is associated. The code may be used as an index into a database that may store additional information about the object. The specific information that may be stored may vary according to the desired implementation. For example, in point-of-sale barcode systems the database entry associated with a barcode may include the price of the item (among other data).

Some barcode scanners (particularly those used for one-dimensional barcodes) may use laser light (or other light) to scan barcodes. The decoded visual information may be used to lookup the information associated with the barcode in the database. In some examples, barcode scanners may use cameras including image sensors (e.g., complementary metal oxide semiconductor (CMOS) and/or charge-coupled device (CCD) image sensors) which may capture frames of image data (e.g., including two-dimensional arrays of pixels, with each pixel having a corresponding pixel value). Barcodes represented in the images captured by such camera-based barcode scanners may be detected using any desired object detection and/or barcode detection technique and decoded. Camera-based barcode scanners may be effective to detect and decode two-dimensional matrix barcodes (such as quick response (QR) codes). As with one-dimensional barcodes, the decoded barcode code (e.g., an alphanumeric string, numeric code, etc.) may be used to lookup the corresponding entry for the object associated with the barcode.

A particular type of fraud that is sometimes referred to as "ticket switching" involves switching the barcode on one object for a barcode that is associated with a different object. For example, a high value item such as a consumer electronic item may have a barcode label adhered to its packaging. A bad actor may take a barcode label from another, typically less-expensive good, and affix this barcode over the barcode on the consumer electronic item. Accordingly, during checkout, the decoded barcode will result in the bad actor being charged for the lower-priced item instead of the correct price for the consumer electronic item.

Described herein are various systems and techniques that may be used to verify that the object is properly associated with the barcode scanned for the object. In various examples, a machine learning-based classifier may be deployed on a camera-based barcode reader (e.g., a barcode reader including an image sensor). Images of various objects containing their barcodes can be used as template images for object verification purposes. In addition to the information about the barcode in a given object's template (e.g., the barcode type, identifier data (e.g., the decoded code of the barcode), the coordinates of the barcode in the template image, etc.) the object template data can also include information about coordinates of a region-of-interest (ROI) in the template image. Accordingly, the template data for a given object, which may be looked up using a decoded barcode, establishes a tight correlation of the object's ROI with the size, location, and orientation of the object's barcode.

Object template data (which may also be referred to as "item template data") may be stored in memory of the scanner device and/or in memory of another device that is configured in communication with the scanner device (e.g., a point-of-sale computing device and/or a remote computing device). When a scanner device captures an image of an object that includes the barcode, the barcode may be detected, decoded, and the decoded barcode code may be used to lookup the object template data in memory. The object template may, in some examples, include data of the barcode (e.g., at least one of a type of the barcode, coordinate data representing a location the barcode, orientation data representing an orientation of the barcode, and size data representing a size of the barcode). The object template may, in some examples, include a template image for the object. The object template may, in some examples, include information about the location, dimensions, and/or orientation of the barcode in the template image (e.g., bounding box data for the barcode in the template image) as well as information about a region-of-interest for the item (e.g., a region-of-interest bounding box in the template image). For example, a first bounding box may identify the barcode in the template image while a second bounding box in the template image may establish a region-of-interest for the first item. A sub-image corresponding to the region-of-interest may be extracted from the captured image of the object using the relationship between the barcode in the template image and the region of interest in the template image (and also by comparing the barcode in the captured image to the barcode in the template image). In some examples, geometric transformations may be performed based on the size, location, and/or orientation of the barcode in the captured image as compared to the barcode in the template image. These transformations (sometimes referred to as "de-skewing") may be used to provide a consistent sub-image that accurately reflects the region-of-interest for the item defined in the object template data in spite of the captured image being closer, further away, capturing a different portion of the object, and/or being captured at a different orientation relative to the template image.

The extracted sub-image may be input into a classifier (e.g., a convolutional neural network, a visual transformer-based model, etc.) and the classifier may be trained to predict the object to which the input sub-image pertains. If the predicted object matches the object associated with the barcode, this indicates that the barcode and the object are properly associated with one another (e.g., no ticket switch has occurred and a sale of the item may proceed). Conversely, if the predicted object does not match with the object associated with the barcode, a ticket switch may have occurred. An error message, or other output indicating a mismatch, may be generated. Advantageously, providing a consistent region-of-interest of the captured image as determined using the region-of-interest defined in the item template data to the classifier network may result in more accurate performance of the classifier network. This is because captured images (e.g., images captured by a camera-based scanner) may capture different views and/or portions of an object. The views in captured images may be at different ranges and the object may be rotated differently. In addition, the various captured images may be under different illumination conditions. Such diverse views of different portions of a captured object may result in low-accuracy classification by image classifier networks. As such, the region-of-interest defined in the item template data may be used to extract a relatively consistent sub-image from captured images that conforms to the region-of-interest defined in the item template. The classifier network may be better able to classify such images since they are more similar to what has been seen by the classifier network during training.

Machine learning techniques may be used to recognize and/or classify objects in image data and/or to generate encoded representations of inputs and/or to generate predictions. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a diagram 100 of a barcode-aware object verification system, in accordance with various aspects of the present disclosure. The scanner device 102 is depicted with various components that may be included in a camera-based barcode reader, although additional components, fewer components, and/or different components may be included in various implementations.

Scanner device 102 may comprise one or more processors, such as processor(s) 104, one or more memories, such as non-transitory computer-readable memory 103, a camera 108 (e.g., a CMOS-based camera and/or CCD-based camera), and/or a light source 110. The light source 110 may be effective to output light in any desired wavelength (e.g., infrared) to illuminate the scene for capturing images by the camera 108. In various examples, the light source 110 may be optional. In various examples, the memory 103 may store various item templates 116, as described in further detail below. Additionally, in some examples, the scanner device 102 may execute the various barcode-aware object verification steps described herein, while in other examples, a remote device or devices (e.g., device(s) 126) may store one or more item templates 116 and/or may execute one or more of the various barcode-aware object verification steps. Device(s) 126 may be a point-of-sale device, a server device, and/or some combination of the two. Device(s) 126 may include a non-transitory computer-readable memory 105 which may, in some cases, store the item templates 116.

In various further examples, computer-readable instructions configured to execute the machine learning based classifier (including the model's parameters) may be stored in memory 103 and/or memory 105. In various examples, the various processing techniques described herein may be executed locally on the scanner device 102 and/or on a local point-of-sale computing device in order to provide low-latency barcode-aware object verification. In various other examples, one or more of the various processing techniques may be executed remotely on one or more computing devices configured in communication over a network with the scanner device 102 and/or the device(s) 126.

Memory 103 and/or 105 may include one or more non-transitory storage media such as, for example, volatile and/or non-volatile memory that may be either fixed or removable. Memory 103 may be configured to store information, data, applications, instructions or the like for enabling scanner device 102 and/or device(s) 126 (and components thereof) to carry out various functions in accordance with the various examples described herein. For example, the memory 103 could be configured to buffer input data for processing by processor(s) 104. Additionally or alternatively, the memory could be configured to store instructions for execution by processor(s) 104. Memory 103 and/or 105 may in some cases be considered primary memory and be included in, for example, RAM or other forms of volatile storage which retain its contents only during operation, and/or memory 103 and/or 105 may be included in non-volatile storage, such as ROM, EPROM, EEPROM, FLASH, or other types of storage that retain the memory contents independent of the power state of the scanner device 102 and/or device(s) 126. Memories 103, 105 could also be included in a secondary storage device, such as external disk storage, that stores large amounts of data. In some embodiments, the disk storage may communicate with processor(s) 104 using an input/output component via a bus or other routing component. The secondary memory may include a hard disk, compact disk, DVD, memory card, or any other type of mass storage type known to those skilled in the art.

The scanner device 102 may be activated (e.g., via a trigger pull or simply by placing an object in the field-of-view of an activated camera 108) to capture image data 124 (e.g., at least one image frame) of a physical object that includes a barcode 122. In an embodiment, a trigger pull begins a scanning session of the scanner device 102 during which the scanner device 102 captures image data 124 and a release of the trigger ends the scanning session. In the example depicted in FIG. 1, the object is a bottle that includes some text, graphics, and a barcode.

The memory 103 may store instructions effective to detect and decode the barcode included in the captured image data 124 (at block 130). Detecting the barcode may be performed using an object detector that may determine a bounding box around the barcode in the frame of captured image data 124. Decoding the barcode may include generating the decoded code (e.g., an alphanumeric string, a numeric code, and/or some other data representation of a code) that is encoded by the barcode. The code may be used, at block 132, to perform a lookup to determine an item template (e.g., among item templates 116) that is associated with the decoded barcode.

As described in further detail below, the item template may include identifier data that identifies the barcode from among other barcodes (e.g., the decoded code from the barcode). In some examples, the item template may include a template image. The template image may be an image of all or some portion of the object to which the particular item template pertains. Region-of-interest data in the item template may define a region-of-interest of the object. In some further examples, the item template may include data describing one or more of the size, orientation, and location of the barcode in the template image. Additionally, the item template may include data describing one or more of the size, orientation, and location of the region-of-interest in the template image (which may or may not include all or a portion of the barcode).

The region-of-interest associated with the item template may be determined at block 134. In various examples, the region-of-interest of the captured image data 124 may be determined based on a comparison of the barcode in the captured image data 124 with the barcode in the template image. As described in further detail below, the region-of-interest in the template image may be applied (e.g., projected) to the captured image data 124 according to the relationship between the region-of-interest in the template image and the barcode in the template image and the detected barcode in the captured image data 124. Accordingly, the region-of interest in the template image may be utilized to determine coordinates of a region-of-interest in the captured image data 124.

At block 136, a sub-image of a cropped determined region-of-interest in the captured image data 124 corresponding to the region-of-interest from the item template may be generated based on a determined ratio of an area of the cropped determined region-of-interest to an area of the determined (e.g., uncropped) region-of-interest in the captured image data 124. The determined region-of-interest in the captured image data 124 can be cropped to be within a boundary of an image frame of the captured image data 124. A ratio of an area of the cropped determined region-of-interest to an area of the uncropped determined region-of-interest in the captured image data 124 can be determined and compared to a threshold. The sub-image is generated if the determined ratio is greater than the threshold. In some further examples, the item template 116 may not store a template image, but may store data that identifies information about the location, size, and/or orientation barcode and/or the region-of-interest that were identified in the template image.

After generating the sub-image of the cropped region-of-interest corresponding to the region-of-interest defined in the item template 116, the sub-image may be input into the classifier model (block 138). The classifier model may be trained to classify items using the region-of-interest image data defined in the various item templates 116. A training dataset may comprise training instances that may include a sub-image for an item paired with a ground truth label (e.g., identifier data) identifying that item. Accordingly, the classifier may receive the sub-image as input and may predict to which item that sub-image pertains. If the predicted item matches the item template associated with the decoded barcode (e.g., the barcode decoded at block 130 from the captured image data 124), the scanned barcode is deemed properly associated with the object/item (block 140). Conversely, if there is a mismatch between the classifier-predicted item and the decoded barcode, the scanned object may be deemed mismatched with respect to the barcode (block 140). Various actions may be taken in response to a detected mismatch, such as declining a transaction, generating an error code indicating an object/barcode mismatch, generating a buzzer sound, etc. The particular output actions are dependent on the desired implementation and/or user interface design and may vary accordingly.

Figure 2:
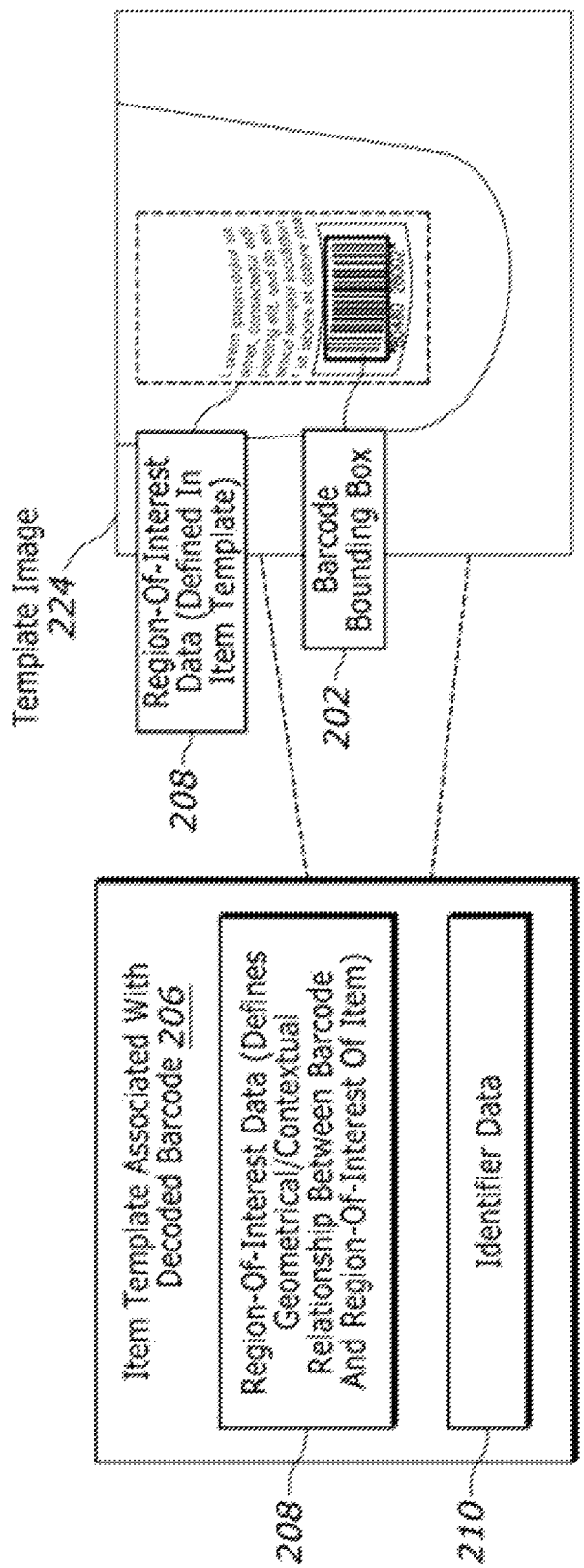
FIG. 2 depicts an example of object template associated with a barcode, in accordance with various aspects of the present disclosure.

FIG. 2 depicts an example of an object template associated with a barcode, in accordance with various aspects of the present disclosure. A template image 224 is depicted of a portion of an object in FIG. 2. The template image 224 may, in some cases, be stored in the item template that is associated with the decoded barcode 206. However, in some examples, instead of storing the template image 224, data describing a location of the barcode bounding box 202 (e.g., coordinates in the image frame), dimensions (e.g., height and width in terms of pixels), orientation (e.g., with respect to a vertical pixel axis, horizontal pixel axis, or some other reference), and/or data describing the region-of-interest data 208 may be included without storing any image data. This may reduce memory requirements and may enable a resource-constrained device (e.g., a barcode scanner or other device) to store more templates. The item template associated with the decoded barcode 206 may also store data representing the spatial and/or geometric relationship between the barcode in the item template and the region-of-interest in the item template. This relationship between the template barcode and region-of-interest may be used to determine where to crop the captured image based on the location/size/orientation of the barcode detected in the captured image to generate a sub-image that corresponds to the region-of-interest for the item.

As shown in FIG. 2, the item template associated with the decoded barcode 206 may include region-of-interest data 208 which may define the geometrical and/or contextual relationship between the barcode for the template image and the region-of-interest for the template image. Accordingly, the region-of-interest data 208 may include data representing a location, dimensions, and/or orientation of the barcode bounding box 202 in the template image. In some further examples, the region-of-interest data 208 may include data representing a type of the barcode (e.g., QR code, UPC code, etc.). Additionally, the region-of-interest data 208 may include data representing a location, dimensions, and/or orientation of the region-of-interest of the template image. The region-of-interest of the template image may or may not include all or a portion of the barcode. For example, in the template image 224 shown in FIG. 2, the bounding box for the region-of-interest data 208 subsumes the barcode bounding box 202. However, in some instances it may be beneficial for the region-of-interest defined in the item template to not include the barcode. This is because this may better enable an image classifier network to accurately classify the object represented in a captured image irrespective of whether a ticket switch (e.g., a mismatched barcode) has been affixed to the object. In some other examples where the region-of-interest does include the barcode, pixels in the barcode bounding box may be disregarded by the classifier network and/or the sub-image may replace all pixels in the bounding box with a predefined pixel value to mask out the barcode prior to classification. The term "bounding box," as used herein may refer to data defining a perimeter that surrounds a region-of-interest (or a barcode) in image data. The perimeter defined by a bounding box may be of any desired shape (e.g., any polygon such as a square, rectangle, hexagon, etc.). In some cases, the bounding box may be user defined (e.g., a user drawn perimeter around a region-of-interest). In some examples, the region-of-interest may be the entire image frame.

The region-of-interest data 208 for a given item template may be generated in any desired manner. For example, the region-of-interest data 208 may be automatically determined (e.g., using image segmentation techniques), may be automatically defined relative to a location of the barcode, or may be manually selected by a user.

The region-of-interest data 208 may also describe a spatial and/or geometrical relationship of the region-of-interest. For example, as shown in FIG. 2, the region-of-interest data 208 may specify the coordinates of a bounding box of the barcode in the template image and/or the coordinates of a bounding box of the region-of-interest in the template image. As such, upon detection of a barcode in a captured image, the appropriate region-of-interest of the captured image may be determined based on the location, dimensions, and/or orientation of the barcode in the captured image and the relationship between the barcode bounding box 202 and the region-of-interest data 208 in the item template. Accordingly, sub-images of captured images may be generated by cropping the captured image data to generate the portion of the captured image data (e.g., the sub-image) that corresponds to the region-of-interest specified in the item template. Various cropping techniques may be used, according to the desired implementation.

The item template may also include any other desired information (e.g., price, quantity in inventory, other identifier codes, etc.). In the example depicted in FIG. 2, the item template may include identifier data 210 that identifies the item template from among other item templates. The identifier data 210 may be, for example, the decoded code for the barcode (e.g., an alphanumeric string or numeric code) that uniquely identifies the item or item type from among other items.

Figure 3:
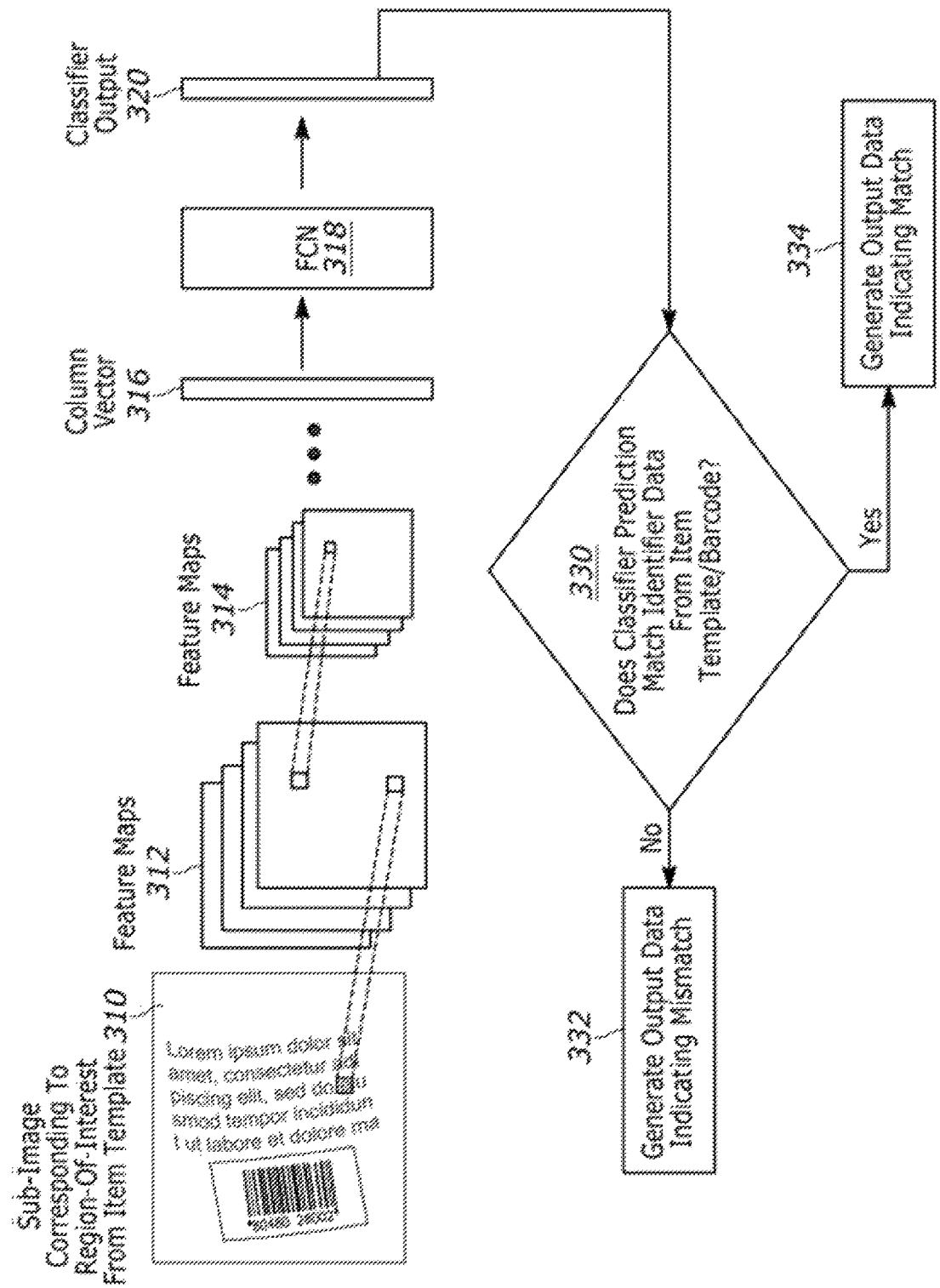
FIG. 3 depicts an example machine learning architecture that may be used to classify a sub-image of an object, in accordance with various aspects of the present disclosure.

FIG. 3 depicts an example machine learning architecture (e.g., a convolutional neural network classifier model) that may be used to classify a sub-image of an object, in accordance with various aspects of the present disclosure. It should be noted that the example machine learning architecture in FIG. 3 is merely one example of a machine learning-based image classifier architecture and that any other desired image classifier may be used in accordance with the various techniques described herein to provide barcode-aware object verification.

As previously described, the input to the classifier model may be the sub-image 310 that has been generated using the cropped captured image based on the region-of-interest defined in the item template data for the decoded barcode. In the example depicted in FIG. 3, the sub-image 310 includes the barcode. However, as previously described, in other examples, the region-of-interest defined in the item template may not include the barcode or may include only a portion of the barcode. In still other examples, the barcode may be masked out to improve accuracy of the classifier model (even in the face of a ticket switch). In the example of FIG. 3, the classifier model includes a convolutional neural network (CNN). However, as known to those of ordinary skill in the art, other image classification networks may be used. For example, recurrent neural network-based image classifiers (RNNs), transformer-based image classifiers (e.g., a visual transformer classifier using the Vision Transformer (ViT)), etc., may be used. Accordingly, the architecture depicted in FIG. 3 is merely used to show one possible implementation.

The sub-image 310 may be a frame of image data including a two-dimensional grid of pixel values. Additional data may be included with the input sub-image 310 such as histograms representing tonal distribution of the image. In some examples, a series of convolution filters may be applied to the sub-image 310 to generate feature maps 312. The convolution operation applies a sliding-window filter kernel of a given size (e.g., 3×3, 5×5, in terms of pixel height and width) over the sub-image 310 and computes a dot product of the filter kernel with the pixel values. The output feature map 312 for a single convolution kernel represents the features detected by the kernel at different spatial locations within the input frame of image data. Zero-padding may be used at the boundaries of the input image data to allow the convolution operation to compute values for the columns and rows at the edge of the image frame.

Down-sampling may be used to reduce the size of the feature maps 312. For example, max-pooling may be used to down-sample feature maps 312 to generate reduced-size feature maps 314 (modified feature maps relative to the feature maps 312). Other pooling techniques may instead be used to down-sample feature maps 312 and generate feature maps 314. Generally, pooling involves a sliding window-filter over the feature maps 312. For example, using a 2×2 max-pooling filter, the largest value from a feature map 312 in a given window (at a given frame location) may be used to represent that portion of the feature map 312 in a down-sampled feature map 314. Max-pooling uses the features with the highest impact on a given window and reduces processing time at subsequent operations. Although not shown in FIG. 3, an activation function may be applied to the reduced size feature maps 314 following the pooling operation. For example, the Rectified Linear Unit (ReLU) activation function or sigmoid function may be applied to prevent diminishing gradients during training.

FIG. 3 depicts only a single convolution stage and a single pooling stage. However, any number of convolutions and pooling operations may be used in accordance with the desired implementation. Once the convolution and pooling stages are completed, the classifier model may optionally generate a column vector 316 from the resulting feature maps by converting the two-dimensional feature maps (e.g., arrays) into one-dimensional vectors. In various examples, the column vector 316 may be a dense feature representation of the input sub-image 310 (e.g., an embedding representing the sub-image 310).

The one-dimensional column vector 316 (representing one or all feature maps 314, depending on the implementation) may be input into a classifier network used to predict classifier output 320, which may be a prediction of an object corresponding to the input sub-image 310. In some examples, the classifier network may be a fully-connected network (e.g., a neural network, multi-layer perceptron, etc.) (FCN) 318. However, any other classifier may be used in accordance with the desired implementation. For example, a random forest classifier, a regression-based classifier, a deep learning-based classifier, etc., may be used. In the example of FIG. 3, the FCN 318 may take the one-dimensional column vector 316 representing the input sub-image 310 as an input and may be trained to predict an object to which that input sub-image pertains. In various examples, the FCN 318 may be trained to generate an item identifier (e.g., the decoded barcode code) that identifies a particular item. For example, the classifier model (including the CNN and the FCN 318) may be trained using training images that include a sub-image (a predefined region-of-interest of a given item, as defined by the item template) paired with the correct identifier data (e.g., the decoded barcode code) as a label for the training instance. In some cases, the classifier model may be trained using both positive samples (where the sub-image and barcode are properly matched) and negative samples (where the sub-image and barcode are mismatched). In such examples, the training instances may include data indicating whether a given training instance represents a positive sample or a negative sample. Binary cross-entropy loss or any other desired loss function may be used during training of the classifier model (and/or its encoder backbone).

The FCN 318 may comprise any number of hidden layers depending on the implementation. In some examples, the FCN 318 may be trained together with the convolutional neural network (CNN) in an end-to-end fashion to classify input images as pertaining to one of a number of items. In at least some other examples, a pre-trained CNN may be used to generate embeddings (e.g., column vectors 316) that may be used as input to the FCN 318 or other classifier. In such examples, the FCN 318 or other classifier may be trained without re-training the CNN.

A softmax layer may be used as a part of the FCN 318. The softmax layer may include a node for each object/item for which the FCN 318 has been trained to classify. Accordingly, the classifier output 320 vector may have n dimensions where n is the number of different items. The value for each dimension may be the score for that image category with all scores in the classifier output 320 vector summing to 1. The element of classifier output 320 vector with the highest score may be selected as the predicted object for the input sub-image 310.

At action 330, logic may be implemented (e.g., using computer-executable instructions executed by the barcode scanner, a point of sale device, and/or any other computing device on which all or part of the barcode-aware object verification system is being deployed) and may determine whether the classifier prediction matches the identifier data from the item template/barcode. For example, the classifier model may output the predicted item's identifier data (e.g., the decoded barcode code for the predicted item). This predicted identifier data may be compared with the identifier data from the decoded barcode of the captured image (e.g., the actual decoded barcode code from the scanned object). If there is a match, processing may proceed to action 334 at which output data may be generated indicating a match. In the case of a point of sale transaction, the price for the item may be displayed and checkout may proceed. Conversely, if there is a mismatch, processing may proceed to action 332, at which output data may be generated that indicates a mismatch. In this case, a transaction may be prevented (as a ticket switch may have occurred), an error message may be displayed, etc. The specific actions taken in response to a match and/or a mismatch are implementation specific and may vary, as desired.

In various examples, instead of, or in addition to, providing a classification head (e.g., FCN 318), the feature representation of the input sub-image 310 (e.g., column vector 316 or another encoded representation of the input sub-image 310) may be used as a signature vector and may be compared against other signature vectors (e.g., item vectors representing regions-of-interest of various different items) stored in a data store that represent encoded regions-of-interests of various items. For example, k nearest neighbors and/or another clustering based algorithm may be used to determine the most similar vectors (corresponding to other items) to the signature vector. In another example, a distance metric may be used to compare the signature vector for the input sub-image 310 (e.g., column vector 316) against a database of signature vectors for all pertinent items (e.g., all items in inventory). Each of the signature vectors may correspond to respective identifier data (e.g., a decoded barcode code for an item) so that the signature vectors can be used for the item classification task. The predicted item may be the item with a signature vector that most closely corresponds to the signature vector generated for the input sub-image 310. Various different distance metrics may be used (e.g., cosine similarity, cosine distance, Euclidean distance, etc.) in accordance with the desired implementation.

In examples where a signature vector is used, the CNN depicted in FIG. 3 may function as an image encoder. Various other image encoders may instead be used apart from a CNN-based image encoder. For example, an encoder-decoder architecture may be used (e.g., an autoencoder, variational autoencoder (VAE), an adversarial network, etc.). In such cases, a reconstruction loss may be used instead of, or in addition to, classification loss during training.

Figure 4A:
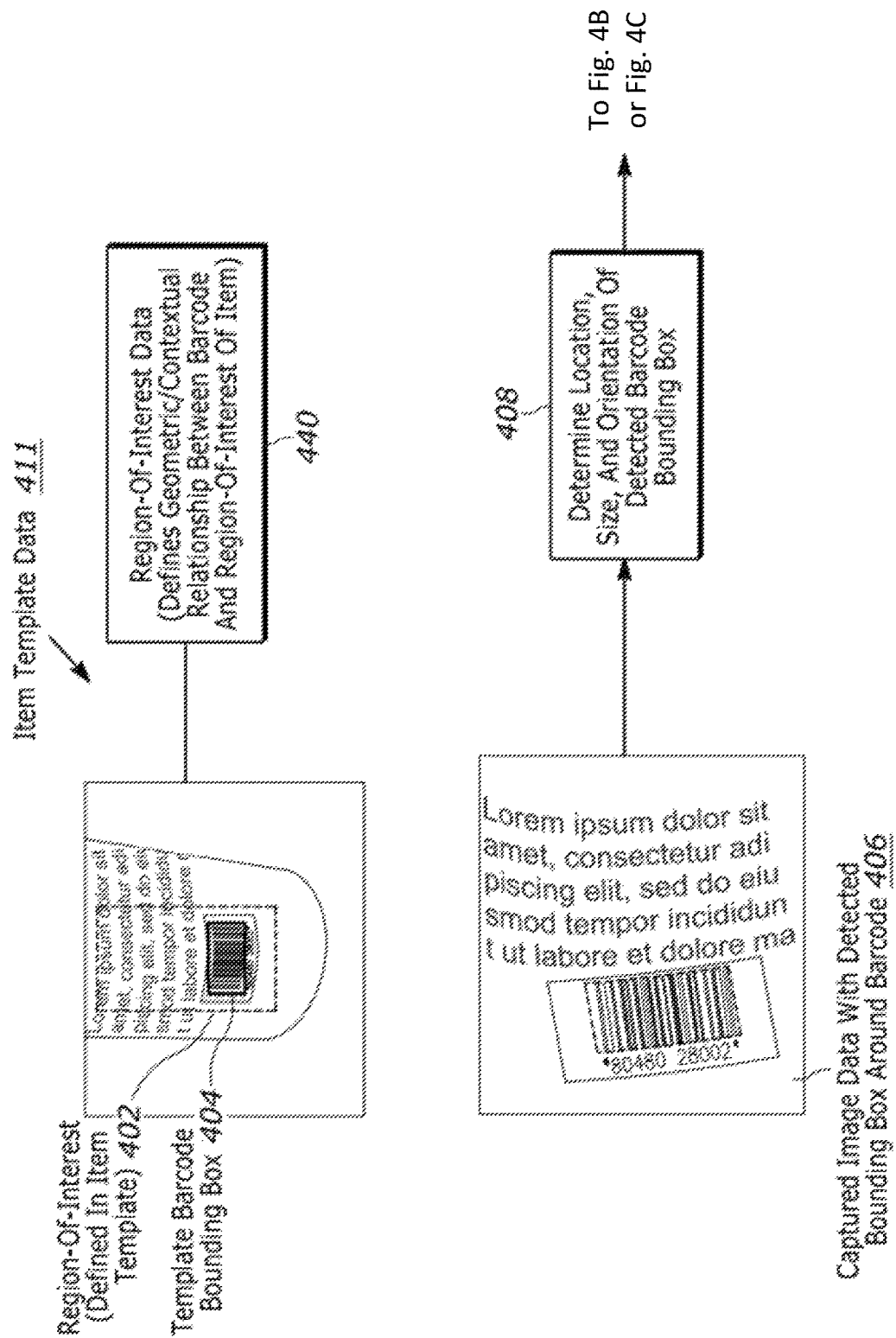
FIGS. 4A-4C illustrate example image processing techniques that may be used to generate sub-images corresponding to regions-of-interest of objects, in accordance with various aspects of the present disclosure.
Figure 4B:
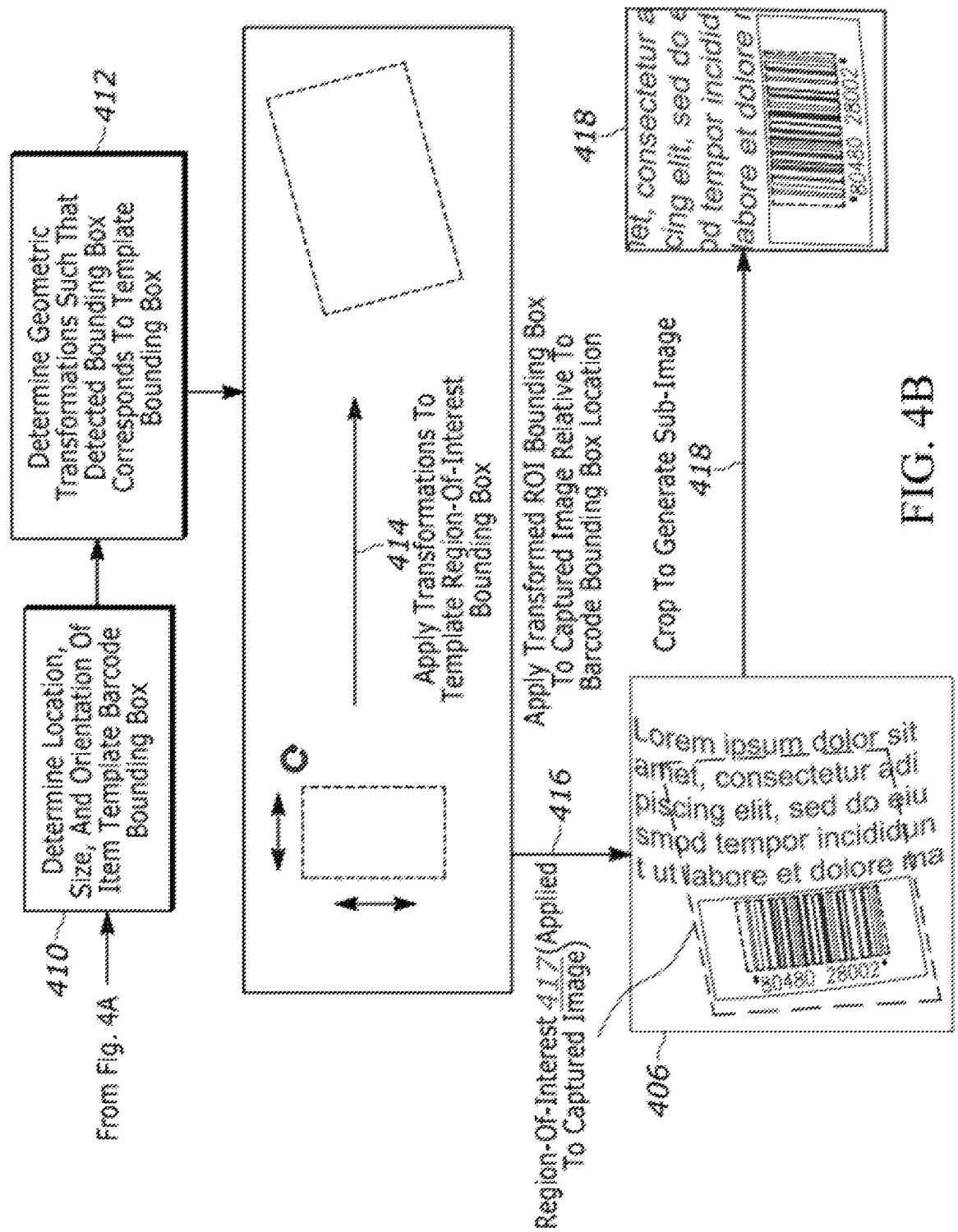
Figure 4C:
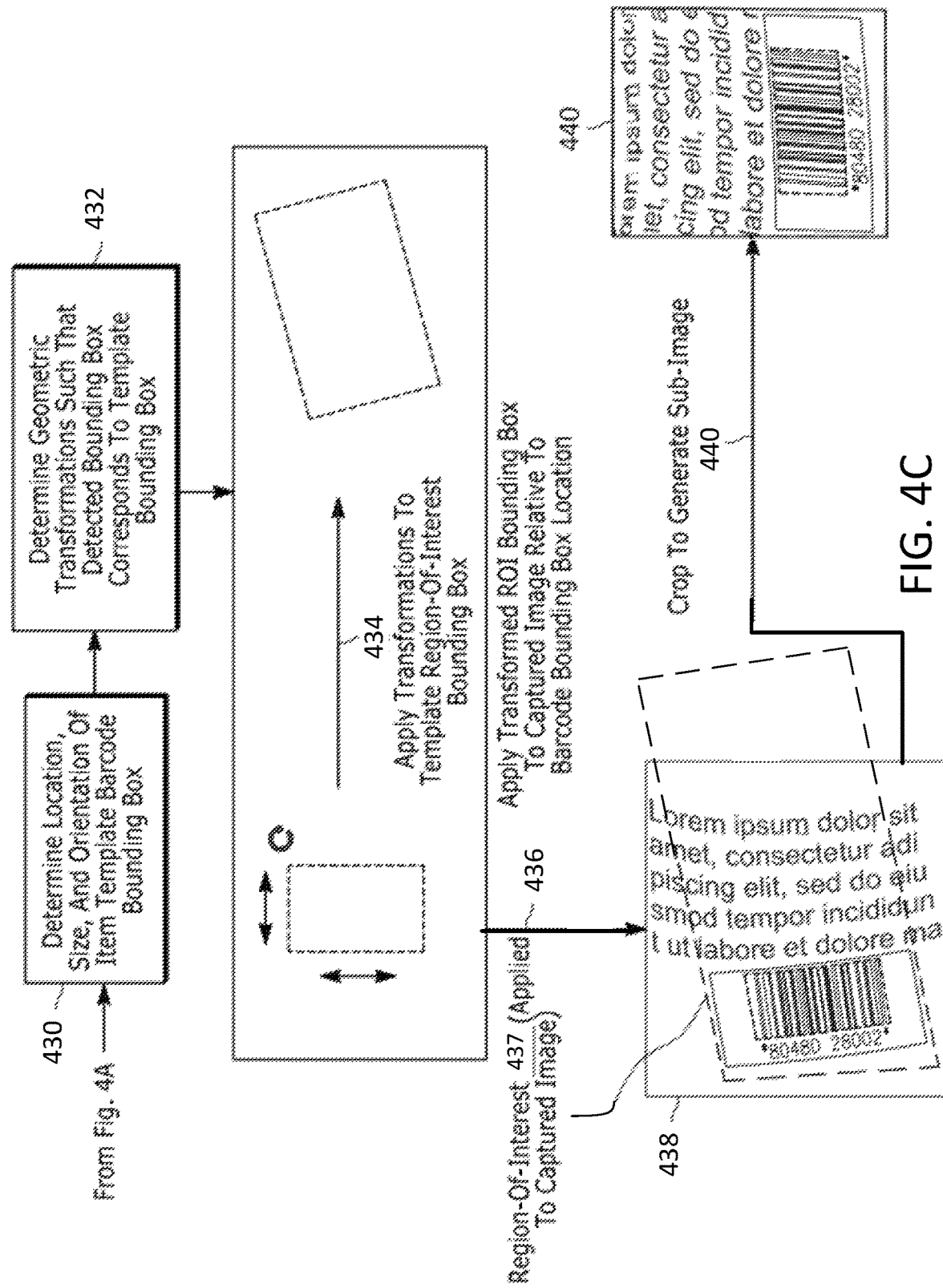

FIGS. 4A-4C illustrate example image processing techniques that may be used to generate sub-images corresponding to regions-of-interest of objects, in accordance with various aspects of the present disclosure. In FIG. 4A, an item may have been scanned using a camera-based barcode reader to generate captured image data. A barcode may be detected in the captured image data. Accordingly, FIG. 4A depicts a captured image with detected bounding box around barcode 406. Upon decoding the detected barcode, the item template data 411 that is associated with the decoded barcode code (e.g., the identifier data for the barcode) may be determined (e.g., using a lookup). The item template data 411 defines a region-of-interest 402 and a template barcode bounding box 404. In some examples, this information may be stored as coordinate data (and/or other data describing the region-of-interest 402 and a template barcode bounding box 404) in the item template data 411. In some cases, a template image (as shown in FIG. 4A) may be stored in the item template data 411, while in other scenarios a template image may not be stored. The region-of-interest data 440 defines a geometric and/or contextual relationship between the barcode in the template image and the region-of-interest of the item.

As shown in FIG. 4A, the orientation and size of the barcode in the captured image both differ significantly relative to the barcode in the template image (e.g., the image associated with the item template data 411). In addition, the amount of the bottle that is represented in the captured image is significantly different than the amount of the bottle in the template image, with the captured image framing the barcode more closely.

At action 408, the location (e.g., pixel coordinates of the bounding box), size (e.g., width and height, in terms of pixels), and orientation (e.g., angle of rotation relative to a selected axis) of the detected barcode bounding box may be determined. Processing may continue to action 410 of FIG. 4B or action 430 of FIG. 4C.

As shown in FIG. 4B, at action 410, a location, size, and orientation of the item template barcode bounding box may be determined. This data may be stored in the item template data 411 and/or may be determined using the barcode in the template image. Processing may continue to action 412, at which the geometric transformations may be determined such that the detected bounding box (around the barcode 406 in the captured image) corresponds to the template bounding box (e.g., in terms of one or more of location, size, and/or orientation). For example, a ratio of the dimensions of the barcode in the captured image vs. the barcode in the template image may be determined. An angle and direction of rotation to rotate the barcode in the template image such that it corresponds to the barcode in the captured image may be determined. A translation of the barcode within the image frame may be determined such that the re-sized and/or re-oriented barcode appears at the same location in the frame (relative to the barcode in the captured image).

At action 414, these geometric transformations may be applied to the region-of-interest bounding box of the item template data 411 so that the region-of-interest of the item in the captured image may be determined. For example, as shown in FIGS. 4A, 4B, the bounding box for the region-of-interest 402 defined in the template has been rotated and re-sized to capture a corresponding region of interest (e.g., region-of-interest 417) of the bottle in the captured image 406. The transformed region-of-interest bounding box may be applied to the captured image relative to the barcode bounding box location in the captured image 406 (block 416) as region-of-interest 417. Thereafter, the captured image may be cropped to the region-of-interest to generate sub-image 418. The sub-image 418 now corresponds to the region-of-interest of the item defined in the item template data 411 and can be input into the classifier network (e.g., FIG. 3).

FIG. 4C illustrates another example image processing technique that may be used to generate sub-images corresponding to regions-of-interest of objects, in accordance with various aspects of the present disclosure. As shown in FIG. 4C, at action 430, a location, size, and orientation of the item template barcode bounding box may be determined. This data may be stored in the item template data 411 and/or may be determined using the barcode in the template image. Processing may continue to action 432, at which the geometric transformations may be determined such that the detected bounding box (around the barcode 406 in the captured image) corresponds to the template bounding box (e.g., in terms of one or more of location, size, and/or orientation). For example, a ratio of the dimensions of the barcode in the captured image vs. the barcode in the template image may be determined. An angle and direction of rotation to rotate the barcode in the template image such that it corresponds to the barcode in the captured image may be determined. A translation of the barcode within the image frame may be determined such that the re-sized and/or re-oriented barcode appears at the same location in the frame (relative to the barcode in the captured image).

At action 434, these geometric transformations may be applied to the region-of-interest bounding box of the item template data 411 so that the region-of-interest of the item in the captured image may be determined. For example, as shown in FIGS. 4A, 4C, the bounding box for the region-of-interest 402 defined in the template has been rotated and re-sized to capture a corresponding region of interest (e.g., region-of-interest 437) of the bottle in the captured image 438. The transformed region-of-interest bounding box may be applied to the captured image relative to the barcode bounding box location in the captured image 406 (block 416) as region-of-interest 437. As shown in FIG. 4C, a portion of the region of interest 437 is captured in the captured image 438. As such, when the region-of-interest from the template is geometrically applied to the captured image 438, a portion of the determined region-of-interest may exceed at least one boundary of the image frame. The applied region-of-interest can be cropped to fit within one or more boundaries of the image frame. Thereafter, the captured image 438 may be cropped to the region-of-interest to generate sub-image 440 (e.g., excluding at least an area outside of the one or more boundaries of the captured image 438). The sub-image 440 now corresponds to the region-of-interest of the item defined in the item template data 411 and can be input into the classifier network (e.g., FIG. 3).

Figure 5:
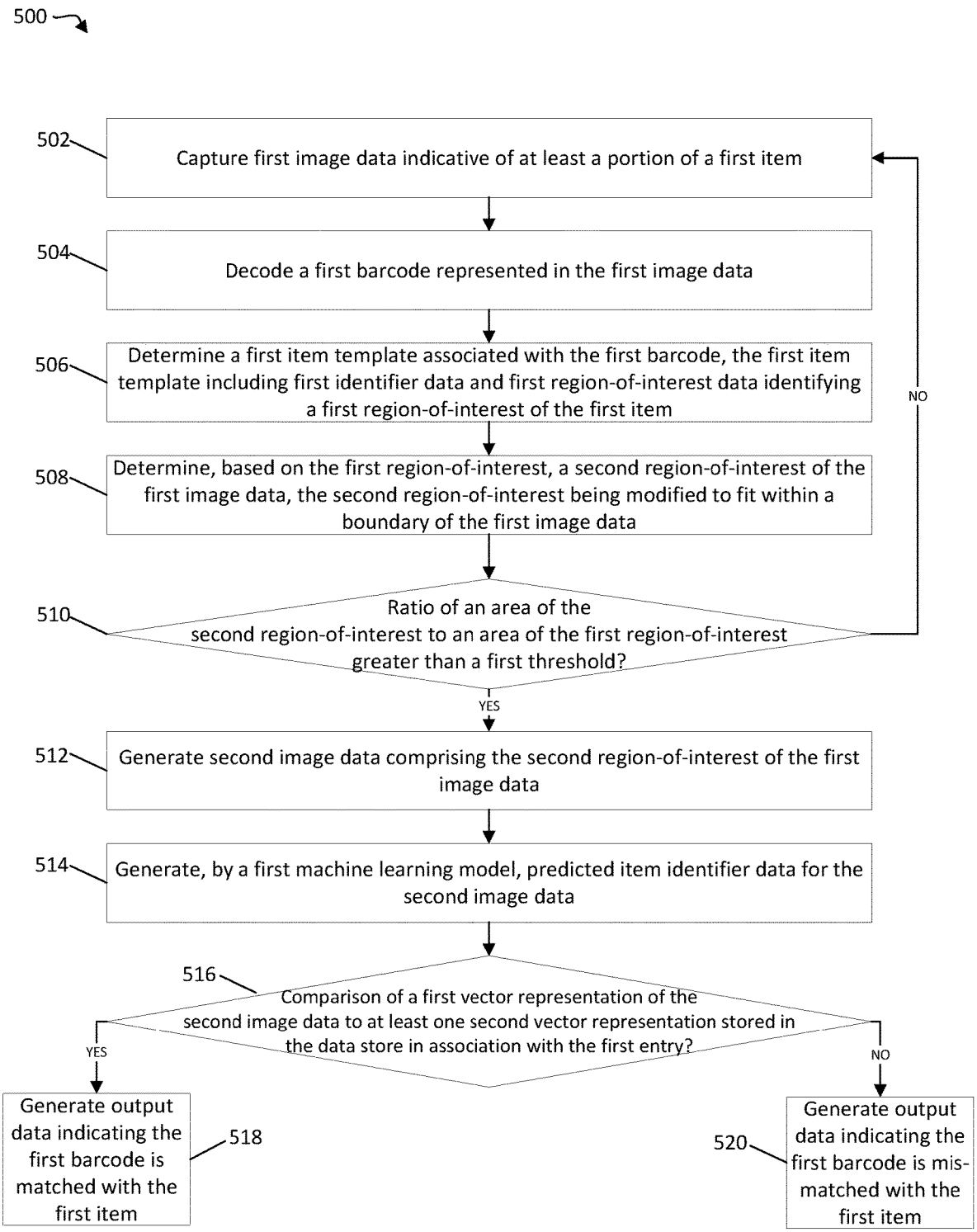
FIG. 5 is flowchart illustrating an example process 500 for barcode-aware object verification, in accordance with various aspects of the present disclosure.

FIG. 5 is flowchart illustrating an example process 500 for barcode-aware object verification, in accordance with various aspects of the present disclosure. Although the example process 500 is described with reference to the flowchart illustrated in FIG. 5, it will be appreciated that many other methods of performing the acts associated with the process 500 may be used. For example, the order of some of the blocks may be changed, certain blocks may be combined with other blocks, blocks may be repeated, and some of the blocks described may be optional. The process 500 may be performed by processing logic that may comprise hardware (circuitry, dedicated logic, etc.), software, or a combination of both. In some examples, the actions described in the blocks of the process 500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

Processing may begin at action 502, at which a scanner device (e.g., a camera-based scanner device) may capture first image data representing at least a portion of a first item. For example, a scanner device may be used to capture an image of a first item, the image including a barcode affixed to, or otherwise associated with, the first item.

Processing may continue at action 504, at which the first barcode in the captured image data may be detected and decoded to generate a decoded barcode code. The decoded barcode code may be an alphanumeric string, a numeric code, and/or any other desired code that is associated with the barcode.

Processing may continue at action 506, at which a first item template associated with the first barcode may be determined. For example, the decoded barcode code determined at action 520 may be used to perform a lookup in a data structure to determine the first item template associated with the first barcode. The first item template may include first identifier data (e.g., the decoded barcode code) and first region-of-interest data. The first region-of-interest data may define a region-of-interest of the first item. At least a portion of the first region-of-interest may be a non-barcode portion of the item. In some examples, the first item template may further include a template image. In some cases, the first item template may include data identifying coordinates of a barcode in the template image and/or coordinates of the region-of-interest in the template image. In some examples, the first item template may include size and/or orientation information describing dimensions and/or orientations of the barcode and/or the region-of-interest in the template image. In some examples, the first item template may define a type of the barcode associated with the item (e.g., a UPC1 code, a matrix code, etc.). The first item template may define a geometric and/or contextual relationship between the barcode in the template image and the region-of-interest in the template image.

Processing may continue at action 508, at which a second region-of-interest of the first image data may be determined. For example, based on the first region-of-interest, a second region-of-interest of the first image data may be determined where the second region-of-interest is modified to fit within a boundary of the first image data.

Processing may continue at action 510. At action 510 it is determined whether a ratio of an area of the second region-of-interest to an area of the first region-of-interest is greater than a first threshold. If the ratio is less than the first threshold, then the processing returns to action 502. If the ratio is greater than the first threshold, then the processing proceeds to action 512.

Processing may continue at action 512, at which second image data comprising the second region-of-interest of the first image data may be generated. The second image data may be a sub-image cropped from the captured first image data to represent the region-of-interest of the first item as represented in the captured first image data. The first region-of-interest of the first image data may be determined based at least in part on a comparison of one or more of the size, location, and/or orientation of the barcode in the captured first image data and one or more of the corresponding size, location, and/or orientation of the barcode defined by the first item template. Geometric transformations may be determined based on the comparison of the captured barcode and the barcode in the template image. Thereafter, these geometric transformations may be applied to the region-of-interest in the template image (e.g., to the bounding box defining the region-of-interest in the template image) and the transformed region-of-interest bounding box may be applied to the captured image data to determine the region of the captured image data that corresponds to the region-of-interest defined in the template image. The captured image may then be cropped to generate the second image data (e.g., sub-image) that corresponds to the first region-of-interest of the first item.

Processing may continue at action 514, at which a first machine learning model (e.g., an image classifier model) may generate predicted item identifier data for the second image data (e.g., the sub-image corresponding to the first region-of-interest of the first item). At action 516, a determination may be made whether the predicted item identifier data output by the first machine learning model matches the first identifier data (e.g., the decoded barcode code for the first item). If so, processing may continue to action 518, at which output data indicating that the first barcode is matched with the first item may be generated. This may indicate that no ticket switch has occurred. Accordingly, if the barcode-aware object verification is used as part of a checkout system, the transaction may be permitted to proceed.

Conversely, if the predicted item identifier data output by the first machine learning model does not match the first identifier data, processing may continue to action 520, at which output data indicating that the first barcode is mismatched with respect to the first item may be generated. In the transaction example, if a mismatch is determined, the transaction may be prevented and/or an alert may be generated.

Figure 6B:
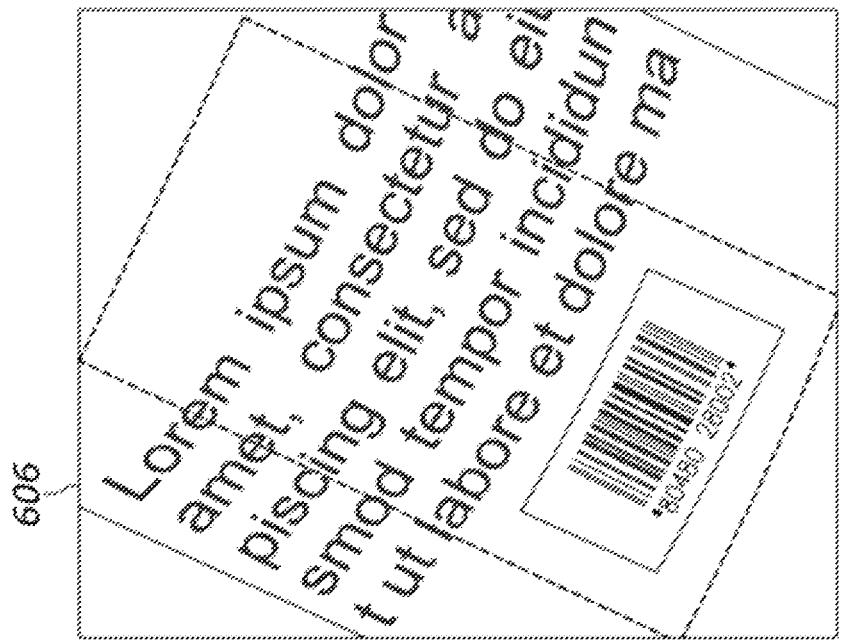
FIGS. 6A-6E depict various examples of sub-image extraction based on a region-of-interest defined in an object template, in accordance with various aspects of the present disclosure.
Figure 6A:
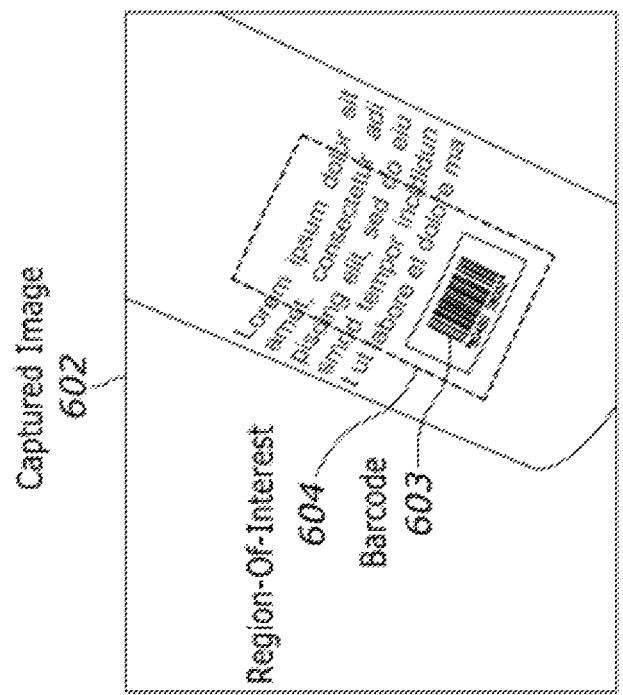

FIGS. 6A-6E depict various examples of sub-image extraction based on a region-of-interest defined in an object template, in accordance with various aspects of the present disclosure. FIG. 6A depicts an example captured image 602 captured by a barcode scanner. In the example image, a barcode 603 has been detected. Additionally, a region-of-interest 604 of the captured image 602 has been automatically determined using the object template, with the object template being identified using the barcode 603. Image 606 in FIG. 6B depicts an example cropping of the captured image 602 to the boundaries of the region-of-interest 604. Note that image 606 is not yet an extracted sub-image, it merely illustrates an example image cropping technique. Any desired image cropping technique may be used in accordance with the various aspects of the present disclosure.

Figure 6D:
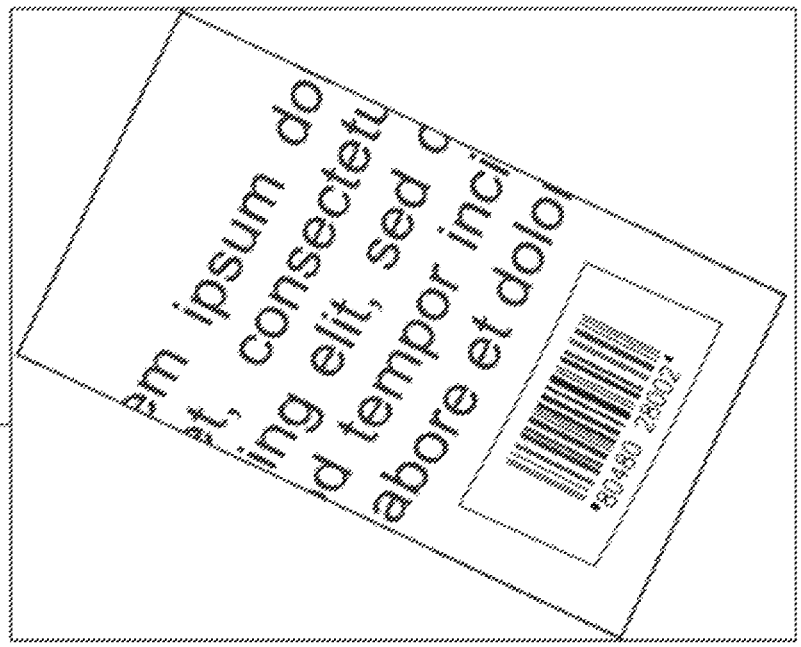
Figure 6C:
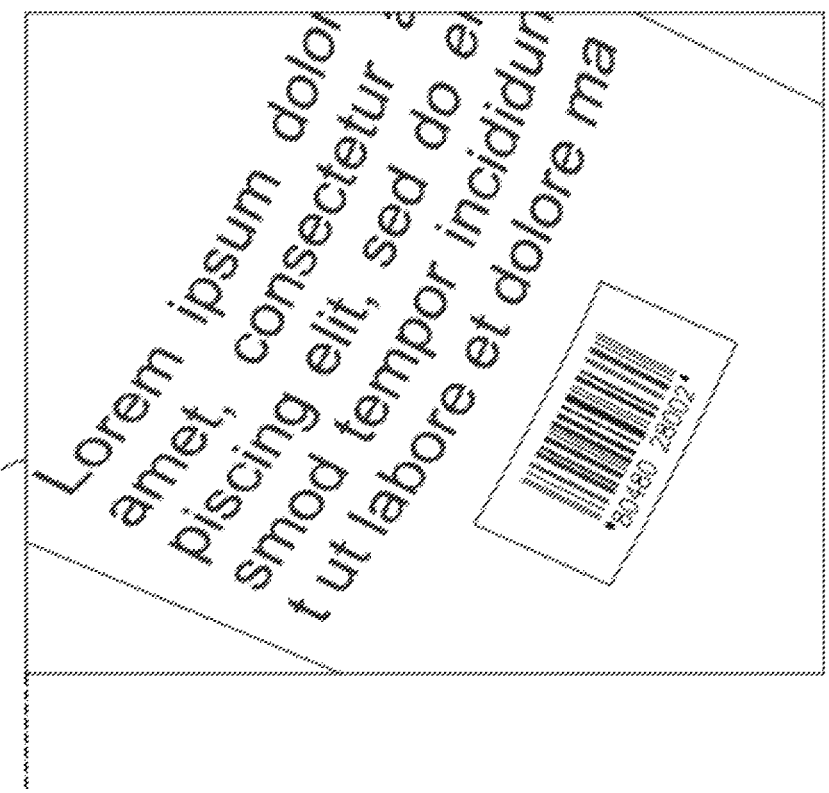

FIG. 6C depicts an example extracted sub-image 610*a* (in which the sub-image is extracted based on the cropping technique of image 606 in FIG. 6B). FIG. 6D depicts another example extracted sub-image 610*b* in which the cropping method of image 606 in FIG. 6B is used and the background of the sub-image has been filled with a predefined color (e.g., white).

Figure 6E:
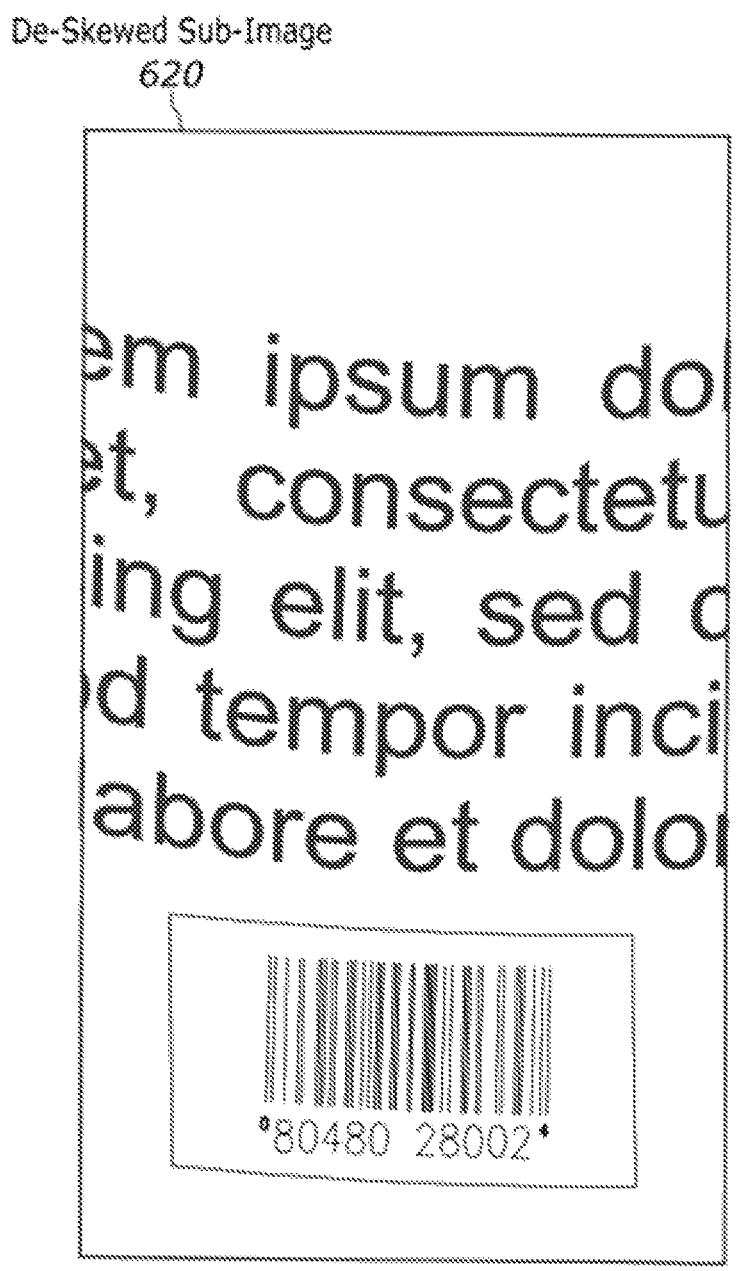

FIG. 6E depicts another example of an extracted sub-image 620 based on the cropping method of image 606 in FIG. 6B, and then de-skewing the cropped image in accordance with the object template (e.g., by rotating the image and/or re-sizing the image).

Among other potential benefits, the various barcode-aware object verification systems described herein may enable computing devices and/or barcode scanner devices to detect a ticket switch using computer vision techniques. In various examples, the image classifier models described herein may be deployed locally with respect to the scanner device (e.g., on the scanner device and/or on a point-of-sale or other local computing device) which may avoid transmission of image data to backend systems—a bandwidth and latency intensive operation. Additionally, various techniques described herein, enable a standardized region-of-interest of a scanned item to be determined based on a item template that establishes a geometric and contextual relationship between the item's barcode and a region-of-interest for that item. Classifying the standardized region-of-interest may greatly enhance classification accuracy as the types of images used during inference may be more similar to those seen in the training data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   capturing, by a scanner device comprising an image sensor, first image data representing at least a portion of a first item;
   decoding, by the scanner device, a first barcode represented in the first image data;
   determining a first item template associated with the first barcode, the first item template comprising first identifier data identifying the first item from among other items and first region-of-interest data specifying a first region-of-interest of the first item;
   determining, based on the first region-of-interest data, a second region-of-interest of the first image data, the second region-of-interest being modified to fit within a boundary of the first image data;
   determining whether a ratio of an area of the second region-of-interest and an area of the first region-of-interest is greater than a first threshold;
   generating second image data comprising the second region-of-interest of the first image data when the ratio is greater than the first threshold;
   determining, by a first machine learning model, that the second image data corresponds to the first identifier data identifying the first item; and
   generating first data indicating that the first barcode is matched with the first item.

2. The method of claim 1, wherein the first machine learning model comprises a convolutional neural network classifier or visual transformer classifier trained to classify a given item based on an image of a predefined region-of-interest of the given item.

3. The method of claim 1, further comprising:
   generating, by the first machine learning model, a first vector representing the second image data;
   comparing the first vector to a plurality of item vectors stored in a data store;
   determining a second vector among the plurality of item vectors based at least in part on a first distance metric used to determine a distance between the first vector and the second vector; and
   determining that the second vector is associated with the first identifier data in the first item template, wherein the determination that the second image data corresponds to the first identifier data is made based at least in part on the second vector being associated with the first identifier data.

4. The method of claim 1, further comprising:
   determining, using an object detector, a first bounding box around the first barcode in the first image data;
   determining a first size of the first bounding box;
   determining a first orientation of the first bounding box;
   determining a second size of a second barcode associated with the first region-of-interest data of the first item template; and
   determining a ratio between the first size and the second size.

5. The method of claim 4, further comprising determining the first region-of-interest of the first image data based at least in part by:
resizing a second bounding box corresponding to the first region-of-interest of the first item in the first item template using the ratio; and
applying the re-sized second bounding box to the first image data.

6. The method of claim 1, further comprising:
capturing, by the scanner device, third image data representing at least a portion of a second item;
decoding, by the scanner device, a second barcode represented in the third image data;
determining a second item template associated with the second barcode, the second item template comprising second identifier data identifying the second item from among other items and third region-of-interest data specifying a third region-of-interest of the second item that includes the second barcode and a second non-barcode portion of the second item;
determining, based on the third region-of-interest, a fourth region-of-interest of the third image data, the fourth region-of-interest being modified to fit within a boundary of the third image data;
determining whether a ratio of an area of the fourth region-of-interest and an area of the third region-of-interest is greater than a second threshold;
generating fourth image data comprising the fourth region-of-interest of the third image data when the ratio is greater than the second threshold;
determining, by the first machine learning model, that the fourth image data is mismatched with respect to the second barcode; and
generating first output data indicating that the second barcode is mismatched with respect to the second item.

7. The method of claim 1, further comprising:
generating third image data representing a third region-of-interest of a second item, the third region-of-interest representing a second barcode of the second item and at least a second non-barcode portion of the second item;
generating second identifier data identifying the second item from among other items;
generating a first training instance comprising the third image data and the second identifier data; and
training the first machine learning model to classify items using a training dataset comprising the first training instance.

8. The method of claim 1, wherein the first region-of-interest of the first item includes the first barcode and a non-barcode portion of the first item.

9. The method of claim 1, wherein the first item template represents at least one of a contextual or a geometric relationship between the first barcode and the first region-of-interest of the first item.

10. The method of claim 1, wherein the first item template further comprises data representing a barcode type of the first barcode.

11. The method of claim 1, wherein the first item template further comprises:
a template image of the first region-of-interest of the first item; and
at least one of coordinate data representing a location in the template image of the first barcode, orientation data representing an orientation in the template image of the first barcode, or size data representing a size of the first barcode in the template image.

12. A system comprising:
an image sensor;
at least one processor; and
non-transitory computer-readable memory storing instructions that, when executed by the at least one processor, are effective to:
control the image sensor to capture first image data representing at least a portion of a first item;
decode a first barcode represented in the first image data;
determine a first item template associated with the first barcode, the first item template comprising first identifier data identifying the first item from among other items and first region-of-interest data specifying a first region-of-interest of the first item;
determine, based on the first region-of-interest, a second region-of-interest of the first image data, the second region-of-interest being modified to fit within a boundary of the first image data;
determine whether a ratio of an area of the second region-of-interest and an area of the first region-of-interest is greater than a first threshold;
generate second image data comprising the second region-of-interest of the first image data when the ratio is greater than the first threshold;
determine, using a first machine learning model, that the second image data corresponds to the first identifier data identifying the first item; and
generate first data indicating that the first barcode is matched with the first item.

13. The system of claim 12, wherein the first machine learning model comprises a convolutional neural network classifier or visual transformer classifier trained to classify a given item based on an image of a predefined region-of-interest of the given item.

14. The system of claim 12, the non-transitory computer-readable memory storing further instructions that, when executed by the at least one processor, are further effective to:
generate, by the first machine learning model, a first vector representing the second image data;
compare the first vector to a plurality of item vectors stored in a data store;
determine a second vector among the plurality of item vectors based at least in part on a first distance metric used to determine a distance between the first vector and the second vector; and
determine that the second vector is associated with the first identifier data in the first item template, wherein the determination that the second image data corresponds to the first identifier data is made based at least in part on the second vector being associated with the first identifier data.

15. The system of claim 12, the non-transitory computer-readable memory storing further instructions that, when executed by the at least one processor, are further effective to:
determine, using an object detector, a first bounding box around the first barcode in the first image data;
determine a first orientation of the first bounding box;
determine a second orientation of the barcode associated with the first region-of-interest data of the first item template; and
determine an amount of rotation between the first orientation and the second orientation.

16. The system of claim 15, the non-transitory computer-readable memory storing further instructions that, when executed by the at least one processor, are further effective to:
- re-orient a second bounding box corresponding to the first region-of-interest of the first item in the first item template based on the amount of rotation; and
- apply the re-oriented second bounding box to the first image data.

17. The system of claim 12, the non-transitory computer-readable memory storing further instructions that, when executed by the at least one processor, are further effective to:
- control the image sensor to capture third image data representing at least a portion of a second item;
- decode a second barcode represented in the third image data;
- determine a second item template associated with the second barcode, the second item template comprising second identifier data identifying the second item from among other items and third region-of-interest data specifying a third region-of-interest of the second item that includes the second barcode and a second non-barcode portion of the second item;
- determine, based on the third region-of-interest, a fourth region-of-interest of the third image data, the fourth region-of-interest being modified to fit within a boundary of the third image data;
- determine whether a ratio of an area of the fourth region-of-interest and an area of the third region-of-interest is greater than a second threshold;
- generate fourth image data comprising the fourth region-of-interest of the third image data when the ratio is greater than the second threshold;
- determine, by the first machine learning model, that the fourth image data is mismatched with respect to the second barcode; and
- generate first output data indicating that the second barcode is mismatched with respect to the second item.

18. The system of claim 12, the non-transitory computer-readable memory storing further instructions that, when executed by the at least one processor, are further effective to:
- generate third image data representing a third region-of-interest of a second item, the third region-of-interest representing a second barcode of the second item and at least a second non-barcode portion of the second item;
- generate second identifier data identifying the second item from among other items;
- generate a first training instance comprising the third image data and the second identifier data; and
- train the first machine learning model to classify items using a training dataset comprising the first training instance.

19. A method comprising:
receiving first image data representing at least a portion of a first item;
decoding a first barcode represented in the first image data;
determining a first item template associated with the first barcode, the first item template comprising first identifier data identifying the first item from among other items and first region-of-interest data specifying a first region-of-interest of the first item;
determining, based on the first region-of-interest, a second region-of-interest of the first image data, the second region-of-interest being modified to fit within a boundary of the first image data;
determining whether a ratio of an area of the second region-of-interest and an area of the first region-of-interest is greater than a first threshold;
generating second image data comprising the second region-of-interest of the first image data when the ratio is greater than the first threshold;
determining, by a first machine learning model, that the second image data corresponds to the first identifier data identifying the first item; and
generating first data indicating that the first barcode is matched with the first item.

20. The method of claim 19, further comprising:
generating, by the first machine learning model, a first vector representing the second image data;
comparing the first vector to a plurality of item vectors stored in a data store;
determining a second vector among the plurality of item vectors based at least in part on a first distance metric used to determine a distance between the first vector and the second vector; and
determining that the second vector is associated with the first identifier data in the first item template, wherein the determination that the second image data corresponds to the first identifier data is made based at least in part on the second vector being associate with the first identifier data.

* * * * *